(12) United States Patent
Jackson et al.

(10) Patent No.: US 8,951,479 B2
(45) Date of Patent: Feb. 10, 2015

(54) DIRECT INDUCEMENT SULFUROUS ACID GENERATOR

(75) Inventors: Edward W. Jackson, Salt Lake City, UT (US); Franklin D. Johnson, Salt Lake City, UT (US)

(73) Assignee: Sweetwater License Holdings, LLC, Sandy, UT (US)

( * ) Notice: Subject to any disclaimer, the term of this patent is extended or adjusted under 35 U.S.C. 154(b) by 717 days.

(21) Appl. No.: 12/413,351

(22) Filed: Mar. 27, 2009

(65) Prior Publication Data
US 2010/0247705 A1  Sep. 30, 2010

(51) Int. Cl.
| | | |
|---|---|---|
| *B01J 19/00* | (2006.01) | |
| *B01F 5/04* | (2006.01) | |
| *B01J 19/26* | (2006.01) | |
| *C05D 9/00* | (2006.01) | |
| *B01F 5/06* | (2006.01) | |
| *B01F 3/04* | (2006.01) | |
| *A23K 1/14* | (2006.01) | |
| *A23K 1/16* | (2006.01) | |
| *C01B 17/98* | (2006.01) | |
| *C01B 17/54* | (2006.01) | |

(52) U.S. Cl.
CPC .............. *B01J 19/26* (2013.01); *B01F 5/0426* (2013.01); *B01J 2219/00768* (2013.01); *C05D 9/00* (2013.01); *B01F 5/061* (2013.01); *B01F 3/0446* (2013.01); *A23K 1/14* (2013.01); *A23K 1/1646* (2013.01); *B01F 5/0415* (2013.01); *B01F 2005/0625* (2013.01); *C01B 17/54* (2013.01); *B01F 2005/0638* (2013.01); *B01J 2219/00772* (2013.01)
USPC ............ 422/160; 422/161; 423/521; 423/543

(58) Field of Classification Search
None
See application file for complete search history.

(56) References Cited

U.S. PATENT DOCUMENTS

| | | | | |
|---|---|---|---|---|
| 127,008 | A * | 5/1872 | Akin .............................. | 423/521 |
| 197,474 | A * | 11/1877 | Jones ............................ | 422/161 |
| 1,254,992 | A * | 1/1918 | Descamps .................... | 422/160 |
| 1,422,327 | A * | 7/1922 | Allen ............................ | 423/543 |
| 4,526,771 | A * | 7/1985 | Forbush et al. ............... | 423/543 |
| 6,080,368 | A * | 6/2000 | Jackson ........................ | 422/161 |
| 6,248,299 | B1 * | 6/2001 | Jackson ........................ | 422/161 |
| 6,500,391 | B1 * | 12/2002 | Jackson ........................ | 422/161 |
| 6,506,347 | B1 * | 1/2003 | Jackson ........................ | 422/161 |
| 6,689,326 | B1 * | 2/2004 | Jackson ........................ | 422/161 |
| 7,141,220 | B2 * | 11/2006 | Jackson ........................ | 422/161 |
| 7,182,919 | B2 * | 2/2007 | Jackson ........................ | 422/161 |
| 7,767,162 | B2 * | 8/2010 | Jackson et al. ............... | 422/160 |
| 2003/0211018 | A1 * | 11/2003 | Jackson et al. ............... | 422/160 |
| 2005/0196329 | A1 * | 9/2005 | Jackson et al. ............... | 422/161 |

\* cited by examiner

*Primary Examiner* — Jennifer A Leung
(74) *Attorney, Agent, or Firm* — Maschoff Brennan

(57) ABSTRACT

This invention describes a sulfurous acid generator that employs a burn chamber that acts as a sulfur hopper. Generally, the burn chamber is not in sulfur communication with a sulfur hopper that is separate and distinct from the burn chamber. Instead, the burn chamber may be adapted to hold enough sulfur to allow the generator to produce sulfurous acid for a desired period of time without needing more sulfur to be added to the sulfur being combusted in the burn chamber.

6 Claims, 7 Drawing Sheets

DIRECT INDUCEMENT SULFUROUS ACID GENERATOR

BACKGROUND OF THE INVENTION

1. Field of the Invention

One important factor that affects the production of food worldwide is the amount of sulfur available to plants and the amount of sulfur-containing compounds in plants that are eaten by animals, including humans. Sulfur is an essential element in plant and animal nutrition. Indeed, sulfur is necessary for the activation of some vitamins and enzymes as well as for the formation of certain oils, amino acids, and proteins. Some examples of sulfur-containing amino acids comprise methionine, cysteine, homocysteine, and taurine. Because methionine is not synthesized by humans and animals it is considered an "essential amino acid," which must be taken up through diet. Additionally, because the level of proteins produced by an animal is often directly linked to the amount of available methionine, and not to the amount of many other amino acids, methionine is considered a "limiting amino acid." Accordingly, plants and animals that are deficient in sulfur and sulfur-containing compounds, such as methionine, may not be able to produce optimal levels of some proteins. Unfortunately, sulfur deficiencies may be becoming more prevalent.

Alkalinity is another important factor affecting the quality, efficiency, and performance of soil and irrigation water. A relative increase in irrigation alkalinity due to the sodium to calcium ratio or a high pH can render irrigation water and soil detrimental to crop growth and irrigation water efficiency.

The invention of this application is directed toward a device that can both increase the level of sulfur that is available to crops as well as reduce the alkalinity of soil and water by producing a sulfurous acid that can be added to water and soil. Generally, this application discusses a sulfurous acid generator, which generates sulfurous acid in a simple and efficient way. In particular, it is directed toward a sulfurous acid generator that produces sulfurous acid by burning sulfur in a burn chamber that acts as a sulfur hopper. The burning sulfur produces sulfur gases, which include sulfur dioxide. Through the use of a direct inducer, the sulfur gases are then drawn toward and held in contact with water, where the gases eventually react with the water and produce sulfurous acid. The sulfurous acid generator produces this sulfurous acid while substantially reducing dangerous emissions of sulfur gases to the air.

2. The Relevant Technology

There are several sulfurous acid generators in the art. The prior art devices utilize a variety of sulfur hoppers, sulfur burn chambers, and mechanisms for dissolving sulfur gases into water. However, many known systems utilize a hopper that is separate and distinct from the burn chamber; a countercurrent flow, pressurized system; and/or a single eductor arrangement as the principle means to accomplish the generation of sulfurous acid. For example, some devices employ a side-by-side or concentric hopper and burn chamber. Such devices may be large, difficult to move, and costly to produce. Also, some devices use an absorption tower to introduce the majority of the water to the system in flow that runs countercurrent to the flow of sulfur gases, such as sulfur dioxide. U.S. Pat. No. 4,526,771 teaches introducing 90% of the system water for the first time in countercurrent flow at the top of the absorption tower. In such devices, the integrity of the absorption tower is vital, and any deficiencies or inefficiencies of the absorption tower lead to diminished reaction and results. Other devices utilize pressurized gas to facilitate flow of gas through the system. (See e.g., U.S. Pat. No. 3,226,201). Pressurized devices, however, are often expensive to manufacture in a manner that ensures the containment and prevents the leakage of dangerous sulfur gases. Even negative pressure machines tend to have the drawback of requiring a source of energy to power a negative pressure generator, such as an exhaust fan. Still other devices rely upon secondary combustion chambers to further oxidize the sulfur. (See e.g., U.S. Pat. No. 4,526,771). An earlier Harmon device utilized a single eductor in combination with a countercurrent absorption tower. The inventor has himself developed several different sulfurous acid generators. (See e.g., U.S. Pat. Nos. 6,080,368, 6,248,299, 6,500,391, 6,506,347, and 6,689,326). Many sulfurous acid generators emit significant or dangerous levels of unreacted sulfur dioxide gas, a harmful and noxious pollutant, into the surrounding environment. Many devices also discharge a visible plume or cloud.

SUMMARY AND OBJECTS OF THE INVENTION

The present invention is directed to a sulfurous acid generator employing a burn chamber that acts as a hopper. The generator can be used to improve alkaline irrigation water by adding sulfurous acid produced by the generator to alkaline water to reduce the alkalinity and/or pH of the water. In addition to making the water less alkaline, adding sulfurous acid to alkaline water and applying the treated water to soil can improve the capillary action of soil, increase cation exchange capacity, decrease tail water run-off, diminish tillage needs, reduce fertilizer costs, and increase the availability of sulfur in the soil and water to act as a nutrient.

Under a non-binding theory, the generator increases crop growth by improving soil and water conditions. Additionally, in this theory, the increased availability of sulfur to act as a nutrient increases the levels of sulfur-containing compounds in crops that are grown in treated soil or with treated water. In this manner, the generator can increase the levels of sulfur-containing amino acids (e.g., methionine), proteins, oils, and other beneficial sulfur-containing compounds in crops. Accordingly, the generator can improve crop health, increase crop production, and increase the nutrient and protein levels in the crops.

Additionally, under this theory, animals that consume the treated crops (or food products containing the treated crops) can obtain high levels of beneficial sulfur-containing compounds, including essential and/or limiting amino acids. As a result, the nourishment the animals receive from the crops allows the animals to be healthier, hardier, and have higher protein levels. Moreover, the nourishment from the treated crops allows the animals to produce more products and/or higher protein products, such as milk, eggs, meat, fur, hair, and/or other products produced by animals.

In many agricultural settings, complicated farm machinery is not practical because it requires technical training to operate and special skills to service and maintain. For sulfurous acid generators, improved design can reduce costs; simplify operation, service, and maintenance; and increase efficiency and safety, thereby, making the generators more practical for agricultural use. The present invention is directed toward a sulfurous acid generator that is simple to produce, operate, service, maintain, and which efficiency produces, contains, and reacts sulfur gases and sulfurous acid without exposing the user or other living things in proximity to the generator to dangerous sulfur gas emissions.

It will be appreciated that a specific energy source is not necessarily required by the described generator. Therefore use of the generator is not necessarily restricted to locations where a particular power source, like electricity, is available or can be generated for use.

Unlike much of the prior art, the present invention is designed to manage the amount of water in contact with sulfur gases and the duration of the contact without creating or minimizing back pressure in the system or relying upon pressurization of the gases to cause the sulfur gases to flow through the sulfurous acid generator. This reduces the complexity of the generator and the need for additional equipment, such as air compressors used by some prior art devices.

Generally, the described generator comprises a burn chamber that acts as a sulfur hopper, a gas pipeline, a water line, and an inducer. Additionally, the generator can comprise any other suitable component, such as a blender, a vent stack, and/or a demister device.

While many prior art devices comprise a sulfur hopper that is sized and configured to introduce additional sulfur into the burn chamber while sulfur is being combusted, the described generator does not comprise a hopper that is separate and distinct from the burn chamber. Instead, the burn chamber is adapted to hold a large enough charge of sulfur to allow the generator to produce a desired concentration of sulfurous acid for a desired period without needing additional sulfur to be introduced into the chamber to augment the charge. For example, the burn chamber can have a capacity large enough to hold enough sulfur to burn for up to between about ½ an hour and 1,000 hours without needing additional sulfur to be added to the chamber. In another example, the burn chamber has a capacity that allows it to contain a sulfur charge large enough to burn for up to between about 1 hour and about 100 hours. In still another example, the burn chamber is sized to hold charge large enough burn for up to between about 2 and about 24 hours. In yet another example, the burn chamber is sized to hold a charge that is large enough to burn and create sulfurous acid for between about 8 and about 16 hours. Indeed, in some preferred embodiments, the burn chamber is sized to hold a charge that is large enough to burn and create sulfurous acid for between about 11 and about 13 hours.

The burn chamber can be constructed of any material or materials capable of withstanding the corrosiveness of the sulfur and the heat of combustion. In one example, the burn chamber is constructed of stainless steel. In another example, however, the burn chamber is constructed of a concrete, such as SAGGREGATE™ concrete, as taught in U.S. Pat. No. 6,689,326.

In some cases, the burn chamber has a removable lid or hatch. Such a lid or hatch can serve many purposes, including permitting sulfur to be added to the burn chamber before the sulfur is combusted, covering the charge of sulfur, and providing access to the burn chamber for maintenance and service.

The burn chamber can also have an ignition inlet through which the sulfur is ignited. While the ignition inlet may have any characteristic that allows a user to ignite the sulfur within the burn chamber, in some cases, the ignition inlet is configured to allow a small amount of ignited, molten sulfur to enter the burn chamber and prevent larger debris from entering the burn chamber.

The generator further comprises an air inlet through which air enters the burn chamber to fuel the burning sulfur. Gases produced by the burning sulfur (e.g., sulfur dioxide) exit the burn chamber through an exhaust outlet and flow through a first conduit, such as a gas pipeline.

A supply of water, including any suitable aqueous solution, is conducted by a second conduit, such as a water line. The water supply can be provided to the second conduit from any water source and means capable of delivering sufficient water and pressure. For instance, the water can be supplied to the water line by an elevated water tank or a pump, such as a mechanical or electric pump.

The first conduit and second conduit meet to mix the sulfur gases and the water. In some cases, water flowing through the second conduit passes through an inducer, such as a restricted portion disposed in the length of the second conduit. The inducer creates a differential pressure that acts to draw gases from the first conduit into the water at the point of differential pressure. The differential pressure draws or directly induces sulfur gases into the water in the second conduit without the necessity of pressurizing the sulfur gases. As the sulfur gases are drawn into the flow of water, the gases dissolve into the water to create sulfurous acid, or treated acidic water containing one or more sulfur-containing acids. Some examples of such acids may include sulfurous acid, sulfuric acid, ions of sulfurous acid, ions of sulfuric acid, conjugate bases of sulfurous acid, conjugate bases of sulfuric acid, combinations thereof, and/or other sulfur-based acids.

If the sulfur gases are not directly injected or released into the water as discussed above, the first conduit and second conduit meet and couple with a third conduit as disclosed in the various structures, functions and uses described in U.S. Pat. Nos. 6,080,368, 6,248,299, 6,500,391, 6,506,347, and 6,689,326, which are incorporated herein by express reference.

In some cases, the generator comprises at least one blender to further facilitate the dissolving of sulfur gases into the water. In such cases, the blender is placed downstream from the inducer and lies in the flow path of the water. Such a blender can have any characteristic that allows it to further cause sulfur gases to dissolve into water.

In some cases, undissolved sulfur gases downstream in the second water conduit are trapped in a vent stack. Such a vent stack can perform many functions, including allowing undissolved sulfur gases to be exhausted above the user to prevent the user from inhaling the gases.

The present invention also contemplates the optional use of a demister device. The demister device comprises a heated chamber that can be heated by the sulfur burning in the burn chamber and/or by an additional power/heat source. In some cases, the demister device is a housing constructed to provide means for capturing the radiant heat generated by the burn chamber and the first conduit. Some embodiments of such means comprise a vertical housing whose lower portion is disposed about or above the burn chamber.

The housing defines an inlet connected to the vent stack conduit to receive the vapor or undissolved gases, if any, separated from the water discharging from the generator. In some cases, the demister device provides a heat chamber through which the vapors or undissolved gases pass and are heated and/or dried so as to substantially or entirely demist the vapors or gases. In this manner, the demister device can substantially or entirely eliminate any visible exhaust plume from the generator.

The sulfurous acid that exits the generator can be used in any suitable manner. For example, the sulfurous acid can be used for to treat aqueous water, treat landfills, treat soil, dechlorinate water, and/or improve crop growth. Where the sulfurous acid is used to improve crop growth, it can be used in any suitable manner. For example, the sulfurous acid can be applied to soil before and/or after seeds or crops are planted.

As previously discussed, the sulfurous acid can improve crop growth and increase levels of sulfur-containing compounds (e.g., amino acids, proteins, and oils) in the crops.

Moreover, the crops that have been treated with the sulfurous acid can be fed to animals to improve nourishment to the animals.

It is an object of this invention to provide sulfur gases or a sulfurous acid generator that is simple to manufacture, use, maintain and service.

Another object of this invention is to provide a sulfurous acid generator that comprises a burn chamber that acts as a hopper so as to not require a hopper that is separate and distinct from the burn chamber.

Another object of this invention is to provide on-site, on-demand sulfur gas generation avoiding the expense, equipment, hazardous material management, and personnel needed by many of the prior art methods and apparatus.

It is another object of this invention to eliminate reliance upon countercurrent absorption as the mechanism for creating sulfurous acid, as is taught by much of the prior art.

It is further an object of this invention to create a sulfurous acid generator that is capable of operating without any electrical equipment, such as a pump, air compressor, or exhaust fan that requires a specific energy source, such as electricity or diesel fuels.

It is another object of this invention to produce a sulfurous acid generator that converts substantially all sulfur gases, such as sulfur dioxide, into sulfurous acid and thereby substantially eliminate the emission of harmful sulfur gases.

It is another object of the invention to produce a sulfurous acid generator that uses an induced draw created by the flow of water through the system to draw gases through the otherwise open system.

Another object of the present invention is to provide a sulfurous acid generator with means for substantially eliminating any visible discharge or exhaust plume from the apparatus.

Another object of the present invention is to provide a sulfurous acid generator with means for substantially eliminating any visible discharge or exhaust plume from the apparatus without requiring an additional heat or power source.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

In order that the manner in which the above-recited and other advantages and objects of the invention are obtained, a more particular description of the invention briefly described above will be rendered by reference to specific embodiments thereof, which are illustrated in the appended drawings. With the understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

It will be readily understood that the components of the present invention, as generally described and illustrated in the figures herein, could be arranged and designed in a wide variety of different configurations. Thus, the following more detailed description of the embodiments of the system and method of the present invention is not intended to limit the scope of the invention, as claimed, but is merely representative of the presently preferred embodiments of the invention.

Including by reference to the figures listed above, the described sulfurous acid generator, comprises a burn chamber that acts a sulfur hopper. Sulfur that burns in the burn chamber generates sulfur gas or gases, including sulfur dioxide. The sulfur gases are mixed with and/or dissolved in water, which may include any suitable aqueous solution, to produce a sulfurous acid. As used herein, the term sulfurous acid refers to an aqueous solution that comprises sulfurous acid, an ion of sulfurous acid, a conjugate base of sulfurous acid, or the like. Of course, the sulfurous acid can also comprise any other chemical or element, such as sulfuric acid, ions of sulfuric acid, conjugate bases of sulfuric acid, other sulfur-containing acids, or combinations thereof.

Figure 1:
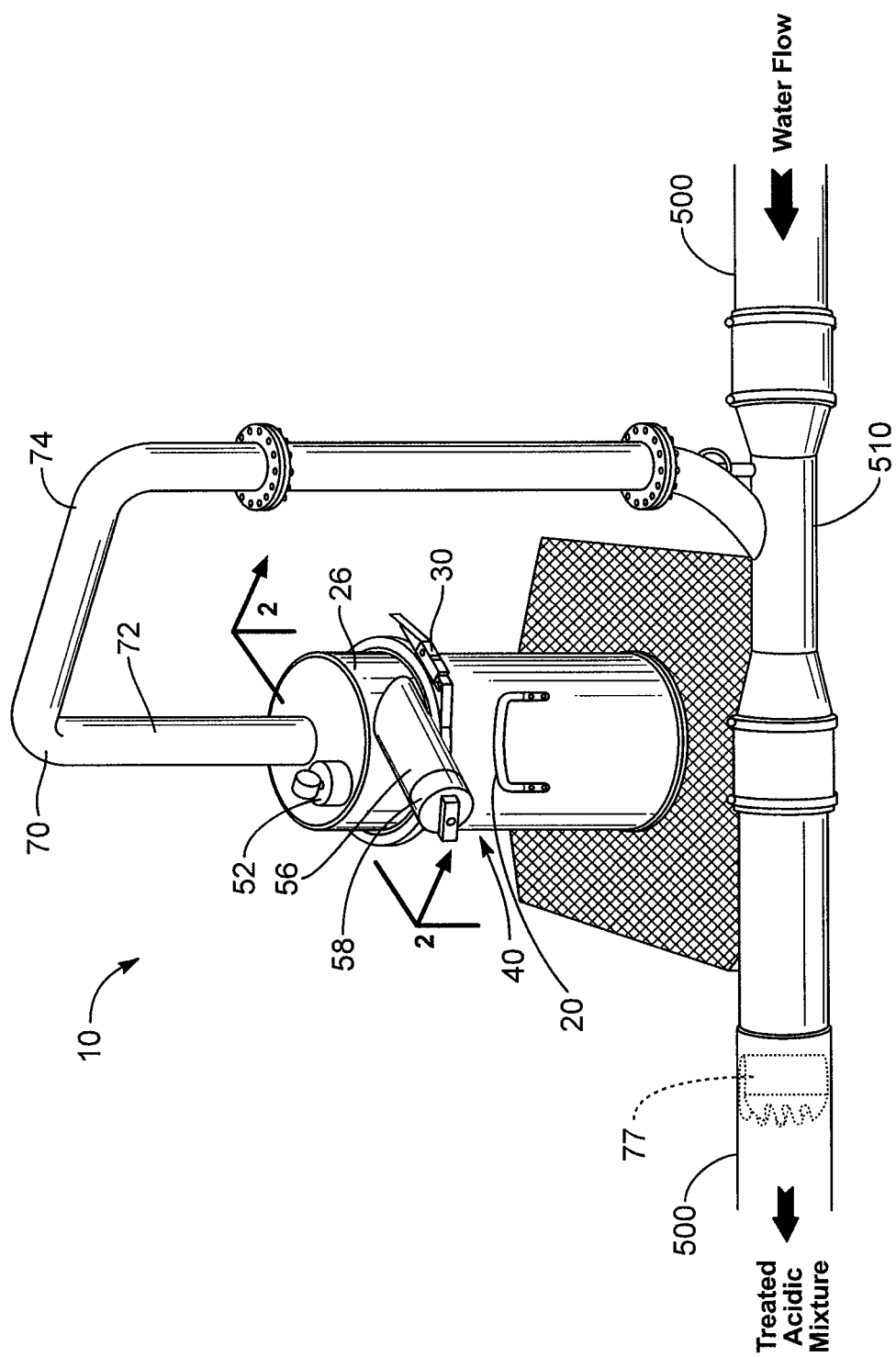
FIG. 1 is a perspective view of some embodiments of the sulfurous acid generator apparatus of the present invention.

Although the generator can comprise any suitable component that allows it to dissolve sulfur gases into water to form sulfurous acid, FIG. 1 shows some embodiments where the sulfurous acid generator 10 comprises a burn chamber 40 that also acts as a hopper, a first conduit (e.g., gas pipeline 70), a second conduit (e.g., a water line 500), and an inducer (e.g., an restrictor 510) that passively introduces sulfur gases into a stream of water. To provide a better understanding of the generator, each of the aforementioned components is discussed below.

FIG. 1 shows generator 10 comprises burn chamber 40. Burn chamber 40 acts to enclose the sulfur charge and direct sulfur gases produced by ignited sulfur through other components of generator 10. Burn chamber 40 can hold any suitable form of sulfur, including a solid, powder, flake, split-pea, pastille, and/or crystalline form.

Unlike the prior art, burn chamber 40 is not connected to a separate or adjacent hopper that is adapted to feed additional sulfur into the burn chamber throughout the production of the sulfurous acid. Instead, burn chamber 40 is adapted to act as both the burn chamber and the hopper. Accordingly, burn chamber 40 is sized to hold a large enough charge of sulfur to allow generator 10 to produce a useful concentration of sulfurous acid for a desired time period without needing, and in some cases, without allowing, additional sulfur to be introduced into the chamber while the initial charge of sulfur is being burned.

Burn chamber 40 can be any size that allows it to contain a large enough charge of sulfur to allow the generator to produce a useful amount of sulfurous acid for a desired period of time without needing more sulfur to be added to the chamber while the initial charge is being burned. In one example, burn chamber 40 is sized to hold a sulfur charge that will burn and produce a useful amount of sulfurous acid for up to between about ½ of an hour and about 1,000 hours. In another example, burn chamber 40 is sized to hold a charge of sulfur that will burn for up to between about 1 hour and about 100 hours. In still another example, burn chamber 40 is sized to hold a sulfur charge that will burn and produce a useful concentration of sulfurous acid for up to between about 2 and about 24 hours. In yet another example, burn chamber 40 is sized to hold a charge of sulfur that will burn for up to between about 8 and about 16 hours. In a preferred example, burn chamber 40 is sized to hold a sulfur charge that will burn for up to between about 11 hours and about 13 hours.

Stated differently, burn chamber 40 can be sized to hold any mass of sulfur that allows generator 10 to operate as described herein. In one example, burn chamber 40 is sized to hold as much as about 2,000 kilograms of sulfur. Other sizes could be configured. In another example, burn chamber 40 is sized to only hold up to about ½ a kilogram of sulfur. In still another example, burn chamber 40 is sized to hold up to about 200 kilograms of sulfur. However, in a preferred example, burn chamber 40 is sized to hold up to between about 20 and about 40 kilograms of sulfur. For instance burn chamber 40 may be sized to hold about 30 kilograms of sulfur.

Burn chamber 40 may have any component or characteristic that allows it to fulfill its intended purposes. In one example, FIGS. 1, 2, 3, and 6 depict some embodiments where burn chamber 40 is substantially cylindrical. Nevertheless, in other embodiments, burn chamber 40 is square, rectangular, oval, oblong, or any other suitable shape. In another example, burn chamber 40 is constructed of any material or materials capable of withstanding the corrosiveness of the sulfur and the heat of combustion. Indeed, in some embodiments, burn chamber 40 is constructed of stainless steel. In other embodiments, however, burn chamber 40 is constructed of a concrete, such as SAGGREGATE™ concrete, as taught in U.S. Pat. No. 6,689,326.

Figure 2:
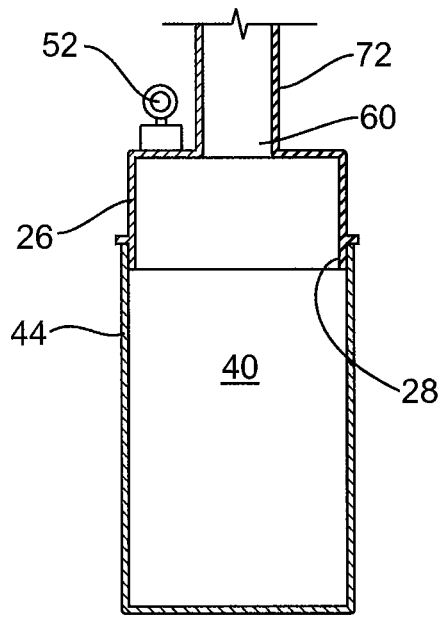
FIG. 2 is a cross-sectional view of FIG. 1 along line 2-2 showing the burn chamber without sulfur.

FIG. 2 shows some embodiments where burn chamber 40 comprises at least one floor member 22 and a chamber sidewall 44. While floor member 22 and sidewall 44 can have any characteristic that allows chamber 40 to act both as the burn chamber and as the sulfur hopper, FIG. 2 shows some embodiments where sidewall 44 and floor member 22 are sealed so as to not contain an inlet through which sulfur may be introduced into burn chamber 44 from a sulfur hopper. Additionally, while sidewall 24 is depicted in the FIG. 2 as being substantially vertical, it is contemplated that sidewall 24 could be sloped from top to bottom, or vice versa.

FIG. 2 also shows that burn chamber 40 comprises a covering (e.g., a lid 26 or a hatch) that is disposed on burn chamber 40. Such a covering may serve many purposes. In one example, the covering permits a charge of sulfur to be added to burn chamber 40 before the sulfur is combusted. In a second example, the covering allows the charge of sulfur to be covered during combustion. In a final example, the covering allows access to the inside of burn chamber 40 for maintenance and service.

Figure 3:
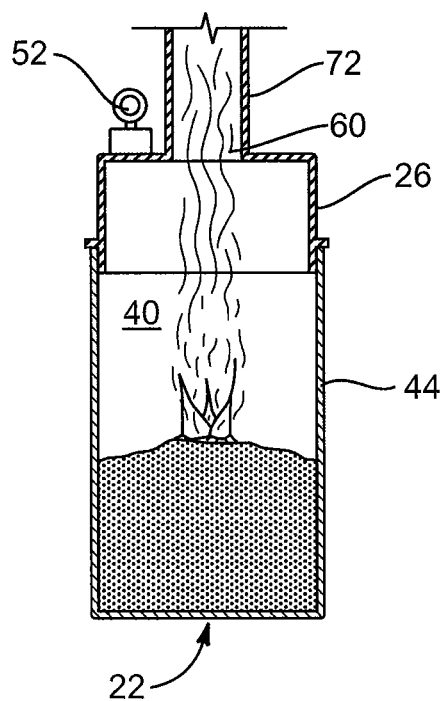
FIG. 3 is a cross-sectional view of FIG. 1 along line 2-2 showing the burn chamber with a charge of sulfur that is ignited.

The covering can have any suitable component or characteristic. For example, Figure FIGS. 2 and 3 show some embodiments where lid 26 comprises a downwardly extending annular ring 28. In another example, FIG. 1 shows lid 26 is adapted to be removably or releasably secured to sidewall 24 by employing one or more removable clamps (e.g., clamp 30), bolts, or any other releasable means for securing lid 26 in place.

FIGS. 1 and 2 show that burn chamber 40 also comprises an air inlet 56 and an exhaust outlet 60. Generally, air passes through air inlet 56 and enters into burn chamber 40 where oxygen in the air acts to fuel the burning sulfur. Sulfur gases, such as sulfur dioxide gas generated from the burning sulfur, exit burn chamber 40 through exhaust outlet 60.

Air inlet 56 and exhaust outlet 60 can have any suitable component or characteristic that allows them to function as described. For example, FIG. 1 shows some embodiments where air inlet 56 comprises a removably and/or adjustably attached air inlet cover 58 that permits the regulation of the rate at which air enters burn chamber 40. Hence, cover 58 permits the regulation of the rate of sulfur combustion. Additional means for controlling the burn rate of sulfur in burn chamber 40 are disclosed in FIGS. 8A through 8E of U.S. Pat. No. 6,689,326, the disclosure of which is incorporated herein by express reference. In another example, while air inlet 56 and exhaust outlet 60 may be located in any position that allows them to act as described, FIG. 1 shows some embodiments where air inlet 56 is tangentially disposed on sidewall lid 26. Similarly, FIG. 3 shows some embodiments where exhaust outlet 60 is defined within lid 26 at the top of burn chamber 40 so as to allow sulfur gases to flow from burn chamber 40 into a first conduit 70.

Figure 4:
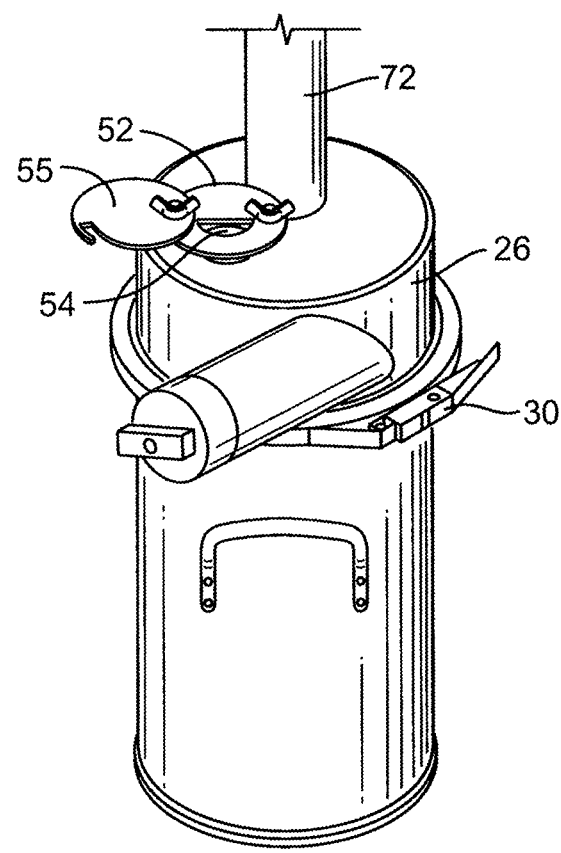
FIG. 4 is a perspective view of some embodiments of an ignition inlet.

According to some embodiments, FIG. 1 shows that generator 10 comprises an ignition inlet 52 through which a charge of sulfur in burn chamber 40 can be ignited. The ignition inlet 52 may have any characteristic that allows a user to ignite the sulfur within burn chamber 40. In one example, however, ignition inlet 52 is comprises means for restricting the passage of debris into burn chamber 40. For example, ignition inlet 52 may be configured to allow a small amount of ignited, molten sulfur to enter burn chamber 40 while preventing larger materials or debris, such as sticks, rags, paper, or other materials larger than the flow of molten sulfur, from entering chamber 40. For instance, ignition inlet 52 can comprise a shelf, a grate, or an opening that is sized to prevent debris from passing through inlet 52 and into burn chamber 40. By way of illustration, FIG. 4 shows that ignition inlet 52 can comprise a shelf 54 on which a scoop of prilled sulfur can be poured and ignited. Molten sulfur can drip off shelf 54 into burn chamber 40 where it can ignite the charge. In another example, FIG. 4 shows ignition inlet 52 can comprise an inlet cover 55 that can be closed or adjustably moved, once the charge in burn chamber 40 has been ignited, to help regulate air flow.

Figure 5:
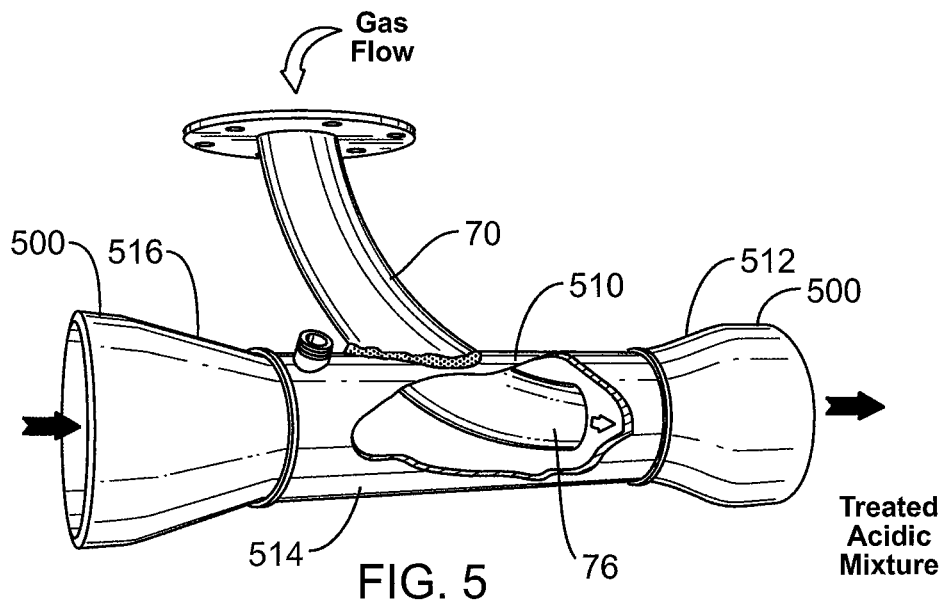
FIG. 5 is a partially broken away perspective view of some embodiments of an inducer.

As mentioned, sulfur gases from burn chamber 40 exits the chamber and enters the first conduit, or gas pipeline 70. Gas pipeline 70 may have any characteristic that allows it to direct sulfur gas from burn chamber 40 into a water stream. FIGS. 1 and 5 show some embodiments where gas pipeline 70 has two ends, in which the first end 72 communicates with exhaust outlet 60 and the second end 76 connects with, extends into, and terminates within the inducer (e.g., restrictor 510). In another example, FIG. 1 also shows that gas pipeline 70 may comprise an ascending pipe 72 that transitions to a transverse pipe 74. In still another example, gas pipeline 70 can be manufactured from any material that is suitable to withstand the heat and corrosion that are associated with the sulfur gases exiting burn chamber 40. For instance, gas pipeline 70 can be made of stainless steel.

FIGS. 1 and 5 show that generator 10 comprises a second conduit, or water line 500, through which water (i.e., an aqueous solution), is conducted. FIG. 5 shows that water line 500 is further coupled to an inducer, such as restrictor 510. Restrictor 510 reduces the diameter of the pipe through which the water is flowing over a length 512. In some embodiments, a length 514 of restrictor 510 encloses pipe end 76. In such embodiments, FIG. 5 shows pipe end 76 may point downstream and terminate within the restrictor 510. In this manner, pipe end 76 may act to further reduce the volume of restrictor 510. Additionally, in some embodiments, another length 516 of restrictor 510 enlarges the diameter of the pipe through which water is flowing. The structure of restrictor 510 and the flow of water through it create a differential pressure that draws sulfur gases from burn chamber 40 and gas pipeline 70 into the water flowing through restrictor 510 without the necessity of pressurizing the sulfur gas. This causes some sulfur gases to dissolve in the water.

While the inducer can comprise the previously described restrictor 510, in other embodiments, the inducer comprises a Mazzei™ Injector made by Mazzei Injector Corporation, Bakersfield, Calif., United States of America. In either case, the described inducer provides means for directly inducing, passively introducing, and/or injecting sulfur gases into a pressurized fluid line.

Water can be supplied to water line 500 by any suitable source or mechanism that supplies the water at sufficient pressure to draw sulfur gases into the water as it passes through the inducer. For instance, the water can be supplied to water line 500 by an elevated water tank or a pump, such as a mechanical or electric pump.

Figure 6:
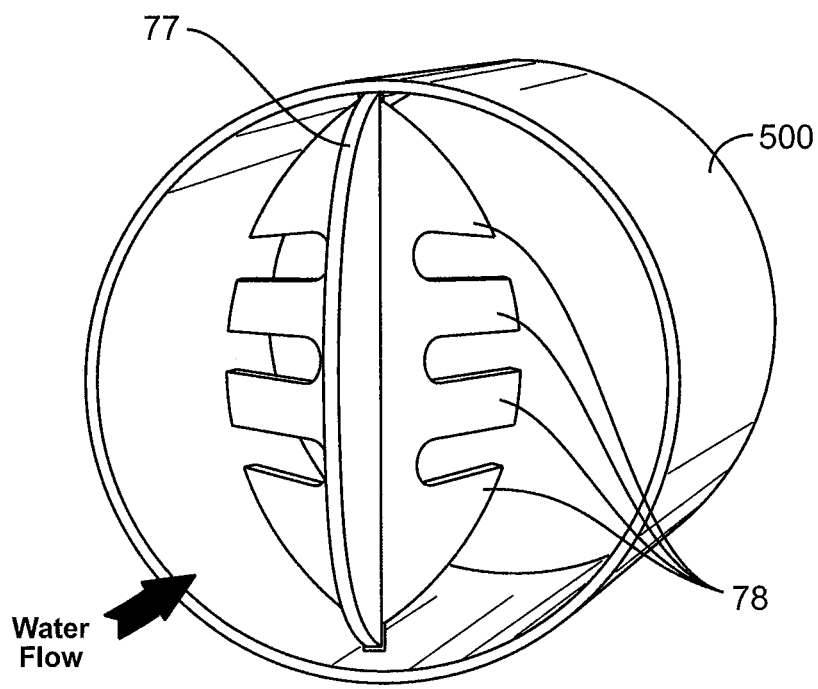
FIG. 6 is a perspective view of some embodiments of a blender.

In some embodiments, to further facilitate the mixture of sulfur gases and water, and the dissolution of sulfur gases in the water, generator 10 comprises at least one blender that is disposed in water line 500 downstream from restrictor 510. The blender can have any characteristic that allows it to further cause sulfur gases to mix with and/or dissolve into the water. For example, the blender can comprise one or more fins, grooves, protuberances, indentations, meshes, and/or other components that cause the sulfur gases and water to mix. By way of illustration, FIG. 6 shows some embodiments where blender 77 comprises fins 78, which cause pressurized water and undissolved sulfur gases to flow over, around, and through the fins. As the sulfur gases and water pass blender 77, it causes a turbulent flow and, thereby, mixes the sulfur gases and water.

Figure 7:
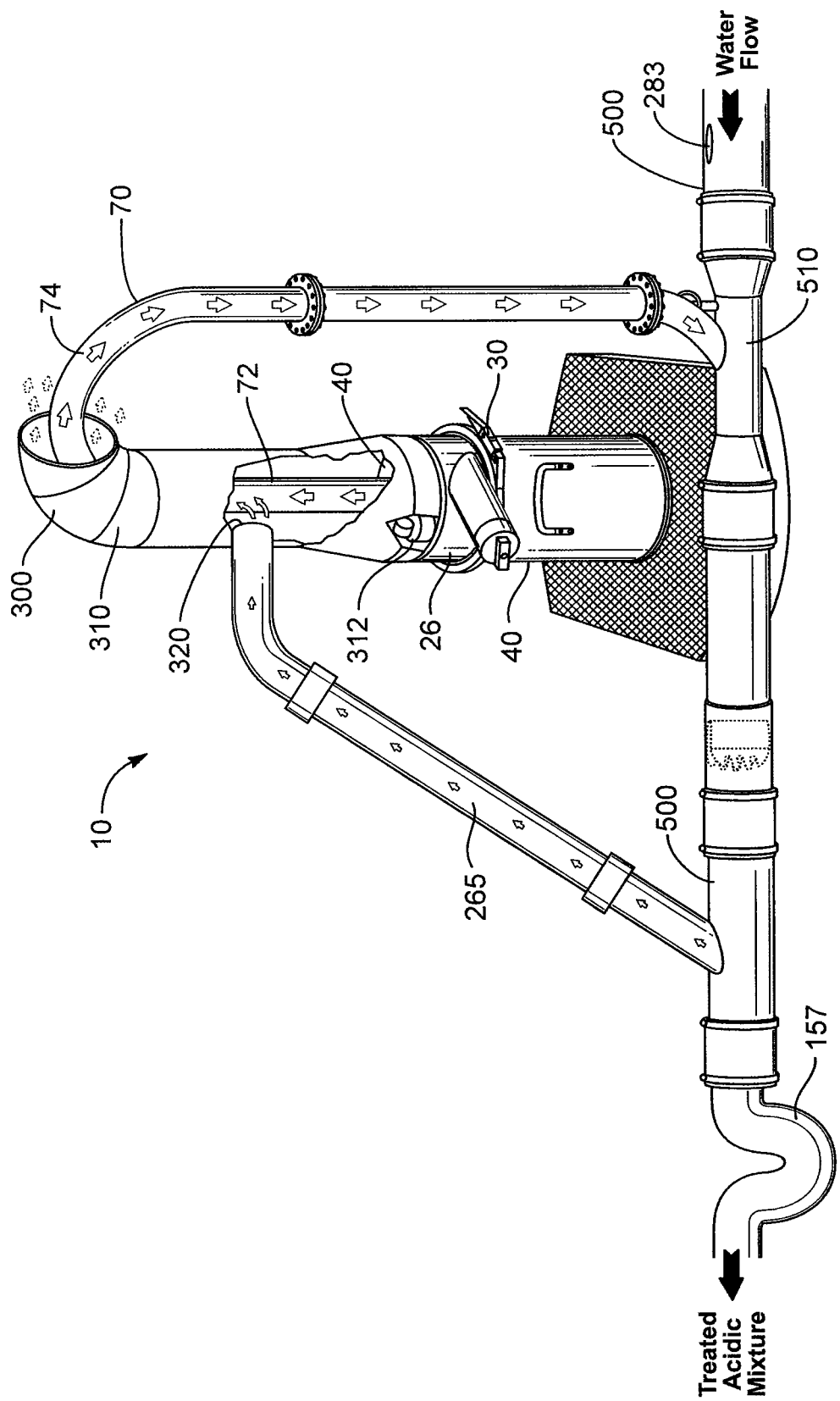
FIG. 7 is a partially broken away view of some embodiments of a demister device.

In addition to the previously mentioned components, generator 10 can comprise any other component suitable for its use. In one example, water line 500 can comprise a water filter to remove large debris from water before it passes through the inducer. In another example, FIG. 1 shows the burn chamber can comprise one or more handles 20 that allow a user to move the chamber by hand. In still another example, FIG. 7 shows that pipe 500 optionally comprises an air injector 283 that disperses additional air into the water. Although generator 10 can comprise any suitable air injector, the preferred air injector is the Mazzei® Injector from Mazzei Injector Corporation, Bakersfield, Calif., United States of America. The use of this injector with a sulfurous acid generator is disclosed in U.S. Pat. No. 6,500,391, the entire disclosure of which is hereby incorporated by reference.

FIG. 7 shows that in some embodiments water pipe 500 is adapted with a U-trap 157. U-trap 157 acts as a means to trap and force undissolved gases, if any, into a vent stack 265, as shown in FIG. 7. Accordingly, U-trap 157 prevents undissolved sulfur gases from exiting pipe 500 in any significant amount. However, in place of, or in addition to, U-trap 157, generator 10 may comprise a mixing tank or a container that allows water and sulfur gases to be agitated and mixed again before being discharged from generator 10. Where generator 10 comprises a mixing tank, vent stack 265 may be connected to the tank to allow undissolved gases, if any, to be vented from generator 10, preferably above the breathing level of the user.

In still another example of an additional component, generator 10 may further comprise a device or means for eliminating or substantially eliminating visible gases and/or vapors produced by generator 10. This device may be especially useful where generator 40 comprises air injector 283. Such a device can eliminate visible gases in any suitable manner, including by drying or reducing the moisture content of the gases and vapors in vent stack 265.

FIG. 7 shows that, in some embodiments, the means for substantially eliminating a discharge plume comprises a demister chamber 300 that includes a housing or sidewall 310. In FIG. 7, housing 310 substantially surrounds or encases the top of burn chamber 40 and a portion of ascending pipe 72. Accordingly, housing 310 acts to contain or capture radiant heat from burn chamber 40 and pipe 72. FIG. 7 also shows housing 310 can comprise a lower opening 312. Such an opening can perform several functions, including permitting access to ignition inlet 52 and allowing air to enter housing 312 to create a chimney effect in which air rises upward through chamber 300.

Housing 310 can have any characteristic that allows it to perform the described functions. In one example, housing 310 has one or more flat or rounded sides. In another example, housing 310 or portions thereof are enlarged or reduced in size relative to the size of burn chamber 40. In yet another example, housing 310 is constructed of any suitable material(s) capable of withstanding the significant temperatures associated with burn chamber 40 and pipe 72. In still another example, because the temperature of housing 310 can be above the ambient temperature in which generator 10 operates, housing 310 can comprise an insulating material or guard material to prevent harm or damage from occurring when an object contacts housing 310.

FIG. 7 also shows housing 310 can define an inlet 320 at which housing 310 is coupled to vent stack 265. As shown in FIG. 7, gases and/or vapors that exit vent stack 265 and enter demister chamber 300 are dried and the moisture content of the gases/vapors is reduced by the heat captured by housing 310. In this manner, housing 310 acts to eliminate or substantially eliminate any visible discharge plume released from generator 10.

As described, in some embodiments, the structure of demister chamber 300 and generator 10 is such that no additional heat or power source is needed. However, in other embodiments where the radiant heat of generator 10 is insufficient to adequately eliminate or reduce the visibility of any discharge plume, generator 10 can comprise a supplemental heat source that is powered by an auxiliary power or heat source (not shown). The supplemental heat source may comprise any suitable heat source, including heated coils, filaments, wires, pipes, etc. Additionally, the supplemental heat source may be disposed in any position that allows it to reduce any discharge plume. For example, the supplemental heat source (e.g., heated coils) could be disposed inside or outside housing 310. Therefore, the present invention contemplates and discloses a variety of means for substantially eliminating any discharge plume or cloud that may be associated with exiting gases and/or vapors.

Figure 8:
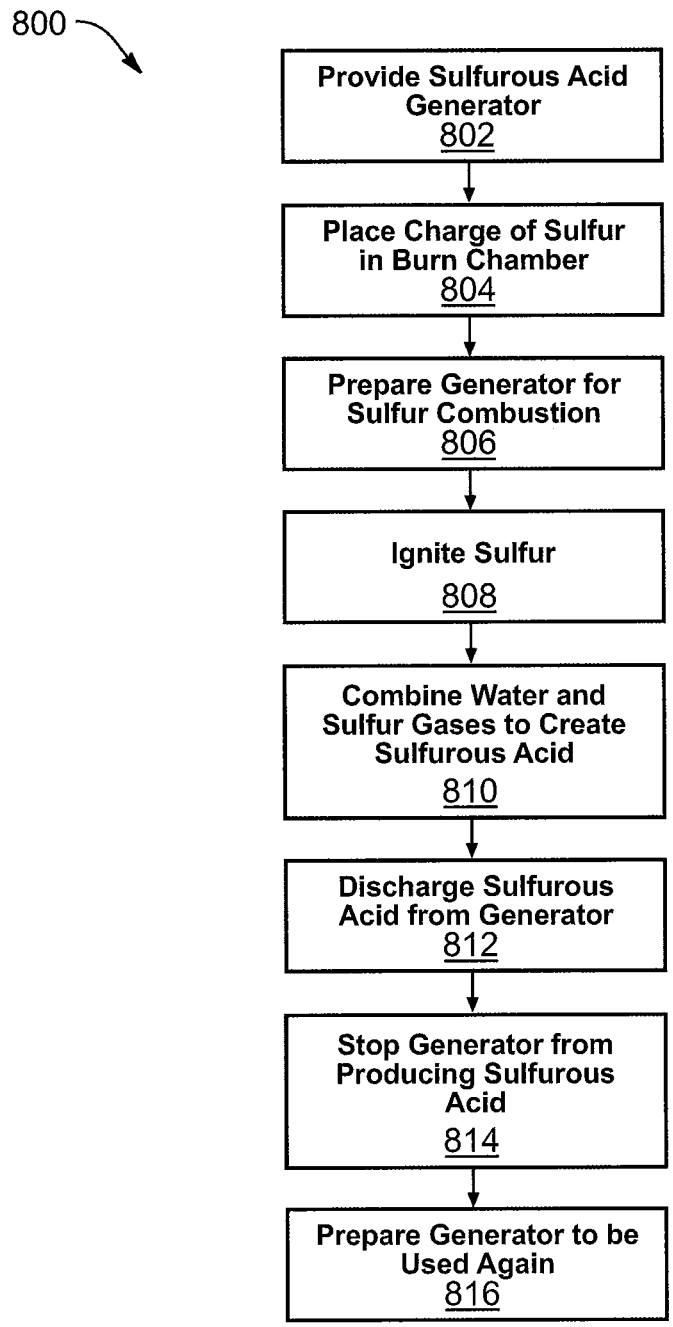
FIG. 8 is a flowchart illustrating some embodiments of a method for using the sulfurous acid generator.

Generator 10 can be used in any suitable manner that produces sulfurous acid. By way of illustration, FIG. 8 shows some embodiments of a typical method 800 for using generator 10. Specifically, FIG. 8 shows the method 800 begins at 802 by providing the described generator 10, which comprises a burn chamber 40 that acts a sulfur hopper. The process continues at 804 by placing a charge of sulfur in burn chamber 40. Because burn chamber 40 acts a hopper, a user need only fill burn chamber 40 once, before the sulfur is ignited. Once the chamber is filled, the user can allow the charge of sulfur to burn without adding more sulfur to the burning charge.

At 806, FIG. 8 shows the user can prepare generator 10 for sulfur combustion. For example, the user can open air inlet cover 58, allow water to flow through water line 500 so as to draw air into burn chamber 40, and/or clamp lid 26 in place. Once prepared, FIG. 8 at 808 shows the charge can be ignited (e.g., via ignition inlet 52). Once lit, the user can close ignition inlet cover 55 to provide a more consistent burn rate.

Next, at 810, FIG. 8 shows the sulfur gases from the burning sulfur will be combined with water in generator 10 in the manner described above to create sulfurous acid. Then, at 812, the sulfurous acid is discharged from generator 10.

FIG. 8, at 814, shows the user can stop generator 10 from producing sulfurous acid at any desired time. Indeed, to stop generator 10 from producing sulfurous acid, the user can either wait until the initial charge is completely combusted, or the user can suffocate the burning sulfur and stop combustion by stopping the flow of water through water line 500 and/or closing air inlet cover 58. Finally, as shown at 816, generator 10 can be allowed to cool, be cleaned, be serviced, be filled with another charge of sulfur, and/or otherwise be prepared to be used again.

The sulfurous acid produced by generator 10 can be used in any suitable manner or for any suitable purpose. For example, the sulfurous acid from generator 10 can be used to treat alkaline water, to dechlorinate water, to treat landfills, and other purposes recognizable to those skilled in the art. to treat soil, to improve crop growth (e.g., increase crop quality and/or yield), and/or to provide more nutritive food to animals. As used herein, the term crop may include seeds, sprouts, seedlings, plants, produce (e.g., vegetables, fruit, cellulose, fiber, etc.), and other suitable forms, parts, or products of plants.

Figure 9:
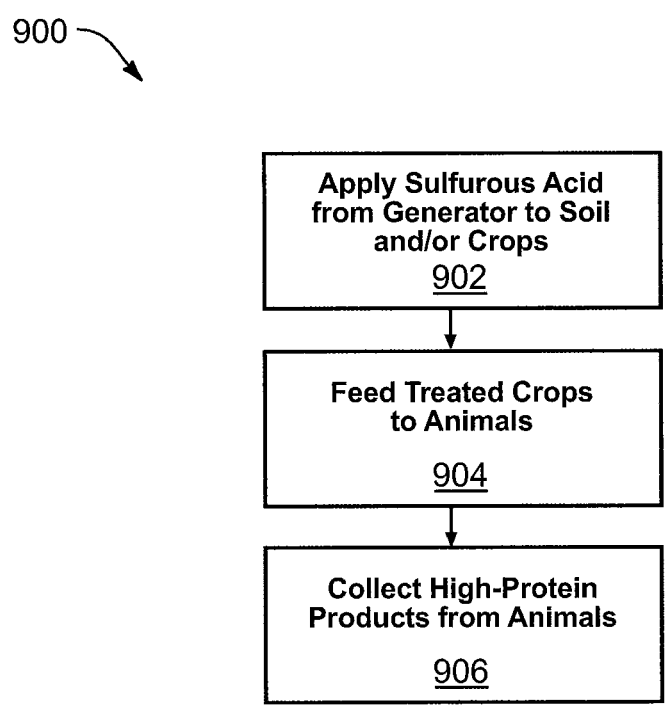
FIG. 9 is a flowchart illustrating some embodiments of a method for using sulfurous acid produced by the sulfurous acid generator.

FIG. 9 illustrates one example of a method 900 in which sulfurous acid from generator 10 is used to improve crop growth and provide more nutritive food to animals. Specifically, at 902, FIG. 9 shows that, in some embodiments, the sulfurous acid produced by generator 10 is applied to soil and/or crops. In such embodiments, the sulfurous acid can be applied in any suitable manner, including by being sprayed, sprinkled, misted, poured, irrigated, or otherwise delivered to a place where it can benefit soil and/or crops.

Where the sulfurous acid from generator 10 is used to improve crop growth (e.g., to improve crop quality and/or yield), the acid can be made available to or be used to improve the growth of any type of plant that will benefit from the sulfurous acid. Accordingly, the sulfurous acid can be used for any plant that benefits from the changes the sulfurous acid causes to water and/or soil. Additionally, the sulfurous acid can be beneficial to crops that will benefit from the additional nutrients made available by the sulfurous acid. Some non-limiting examples of crops that may benefit from increased sulfur nutrients can include one or more varieties of grains (e.g., flax, wheat, rice, maize, barley, oats, etc.), pulses (e.g., peas, lentils, beans (i.e., soybeans, pinto beans, etc), and the like), *Brassica* oilseeds (e.g., canola, rapeseed, etc.), citrus plants (e.g., grapefruits, lemons, limes, oranges, etc.), apples, alfalfas, grasses, clovers, sugar beets, tomatoes, grapes, maizes, sorghums, cottons, potatoes, onions, garlic, chives, leeks, chilies, bananas, nuts (e.g., almonds), ground nuts, sunflowers, sesame seed plants, eggplants, avocados, watermelons, cantaloupes, asparaguses, squashes (e.g., acorn), okras, peaches, zucchinis, spinaches, *Brassicas*, cruciferous vegetable plants (e.g., broccolis, cauliflowers, cabbages, Brussel sprouts, kales, turnips, bok choys, kohlrabis), dark green leafy greens, radishes, mustards, berries (e.g., strawberries, cranberries, goji-berries), legumes, carrots, and other similar or corresponding vegetation, and other plants that benefit from increased availability of sulfur-containing nutrients.

The sulfurous acid produced from generator 10 can improve crop growth in a variety of ways. As previously mentioned, the sulfurous acid can improve crop growth by improving the growing conditions provided to crops by soil and/or water. In one example, the sulfurous acid can be used to improve the growing conditions of soil and/or water by neutralizing bicarbonates and carbonates, lowering the pH, improving water penetration for root development, releasing nutrients that have been previously unusable by the crops, increasing soil porosity, allowing undesired salts to be leached out of the soil profile, improving water consumption by crops, and/or otherwise treating the soil and/or water to improve the growth of crops.

In another example of how the sulfurous acid from generator 10 can improve crop growth, the acid can increase the availability of sulfur and/or sulfur-containing compounds, such as sulfates, that act as crop nutrients in the soil and/or water. Such sulfur nutrients can be taken up by crops to benefit the crops in a variety of ways. For instance, sulfur nutrients may promote nodule formation in legumes. Moreover, sulfur may be a catalyst in chlorophyll production. Accordingly, an increase in sulfur nutrients may improve photosynthesis in crops. Similarly, because sulfur is necessary for the activation of certain vitamins and enzymes, some crops may further benefit from an increased level of sulfur nutrients.

Crops may also use sulfur as a building block for sulfur-containing compounds, including some amino acids. By way of illustration, some crops use sulfur obtained from sulfur nutrients in soil or water for the synthesis of methionine, cysteine, taurine, and/or glutathione. These amino acids can be beneficial to crops in a variety of ways. For instance, glutathione may help protect some plants against oxidative and environmental stresses, including irradiation, heat, and exposure to heavy metals. Furthermore, sulfur-containing amino acids may be used for the production of proteins in the crops. Indeed, methionine is often considered a limiting amino acid, meaning that the level of some proteins is directly related to the amount methionine available, even when all other amino acids are available in abundance. Thus, crops that are deficient in sulfur may be deficient in methionine and, thereby, be deficient for certain proteins. In contrast, however, crops with sufficient sulfur may have high levels of methionine and may, thereby, have higher protein levels than sulfur-deficient plants or plants irrigated with untreated water. Similarly, because sulfur may be active in the conversion of inorganic nitrogen into protein, sulfur nutrients made available by generator 10 may further serve to increase protein levels in crops.

In addition to increasing the levels of sulfur-containing amino acids and/or proteins in crops, crops may use sulfur made available by generator 10 to produce other sulfur-containing compounds, such as oils, components of protoplasm, and defensive compounds. For instance, some crops, such as *Brassicas*, may use sulfur to create glucosinolates, which can serve to protect the crops against fungi and insects.

In sum, where generator 10 is used to treat soil and/or water, crops grown therein may be healthier, hardier, have higher levels of sulfur-containing compounds (e.g., sulfur-containing amino acids, proteins, oils, etc.), yield more produce (e.g., fruits, vegetables, fiber, cotton, cellulose, etc.), or otherwise experience better growth than crops that are grown with untreated soil and/or water.

FIG. 9, at 904 shows that crops that have been grown with water and/or soil that has been treated with sulfurous acid from generator 10 ("treated crops") may be used to provide more nutritive food to animals. In such instances, the treated crops can be fed to any animal that can benefit from consuming the treated crops. Some non-limiting examples of such animals can include humans, cows, horses, goats, birds (e.g., chickens, turkeys, etc.), and other producing animals, warm-blooded animals, and other animals that will benefit from the consumption of the treated crops. Additionally, in such instances, the treated crops can be fed to animals in any suitable form. For example, the treated crops may be fed directly to the animals or the treated crops can be treated, processed, and/or mixed with other ingredients to form a food product that is suitable for animal consumption.

Where animals eat the treated crops, or food products containing the treated crops, the animals may benefit from the crops in several ways. For example, because generator 10 may be used to increase the amount of crops produced, more food may be grown for animal consumption. In another example, the animals may obtain increased levels of sulfur-containing compounds from the treated crops. For instance, the animals may obtain methionine and other sulfur-containing amino acids, such as cysteine, taurine, and glutathione, from the crops. Because methionine is an essential amino acid, or an amino acid that cannot be synthesized by animals but must be supplied by diet, animals that eat crops that are rich in methionine may obtain increased levels of methionine. In turn, because methionine is a limiting amino acid, the methionine may be used to increase the levels of some proteins in the animals. Additionally, cysteine that is obtained directly or indirectly from the treated crops may be used by animal cells to produce some coenzymes and keratin, which is present in skin, hair, nails, hoofs, feathers, fur, etc. Likewise, taurine that is obtained directly or indirectly from treated crops may be used in the production of most animal tissues and in the production of bile for digestion. Similarly, glutathione may be used in the support animal immune systems and in the replication of lymphocytes.

Additionally, animals that ingest treated crops may obtain or be able to produce higher levels of some vitamins and phytochemicals, which are non-nutritive plant chemicals that have protective or disease preventative properties. Some non-limiting examples such vitamins may include thiamine and biotin. Additionally, some non-limiting examples of such phytochemicals may include glucosinolates, chondroitin sulfate, glucosamine sulfate, and organosulfides (e.g., allicin, diallyl sulfide, disulfides, trisulfides, glutathione, indoles, thiols, isothiocynanates/thiocyanates, sulforaphane, etc.). While the phytochemicals may affect the animals in a variety of ways, in some cases, phytochemicals obtained from treated crops may reduce the risk of cancer, reduce the risk of heart disease, act as antimicrobials, prevent cerebrovascular disease, reduce cholesterol, reduce blood pressure, form part of cartilage, and/or otherwise act to increase the health of the animal.

Indeed, animals that consume treated crops may be better nourished than animals that eat untreated crops without further supplementation. As stated, the animals that eat treated crops may eat more food and the food may be more nutritious. Accordingly, the animals may be healthier, require less food to be healthy, have higher protein levels, produce larger quantities of animal products (i.e., milk, meat, fur, wool, hair, skin, eggs, hoofs, nails, horns, and/or other materials produced by the animals), produce higher quality animal products (e.g., higher protein products), and/or otherwise be better nourished. Accordingly, FIG. 9, at 906, shows generator 10 can be used to help produce high-protein animal products for collection.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A sulfurous acid generator, comprising:
    a burn chamber in which to combust sulfur comprising:
        a sidewall lacking any openings, thereby at all times preventing sulfur from being added to the burn chamber through the sidewall;
        a floor member;
        a cover;
        an air inlet;
        a gas outlet; and
        an ignition inlet adapted to restrict the passage of debris larger than a drop of molten sulfur into the burn chamber;
    a first conduit connected to the gas outlet for conducting sulfur gases at substantially atmospheric pressure;
    a second conduit for conducting a stream of water;
    means for passively introducing the sulfur gases conducted in the first conduit into the stream of water in the second conduit;
    wherein the flow of water through the second conduit creates an induced draw to draw sulfur gases through the first conduit;
    wherein the burn chamber has a height that is sufficient to allow a portion of the burn chamber to act as a sulfur hopper to hold sulfur to be combusted without increasing the rate of combustion;
    wherein the burn chamber is not in sulfur communication with a separate sulfur hopper.

2. The sulfurous acid generator of claim 1, wherein the height of the burn chamber is sized to hold enough sulfur to allow the generator to produce a sulfurous acid under at least one operating condition, without the introduction of additional sulfur into the burn chamber, for a period of time selected from:
    (a) between about ½ an hour and about 1,000 hours;
    (b) between about 1 hour and about 100 hours;
    (c) between about 2 hours and about 24 hours;
    (d) between about 8 hours and about 16 hours; and
    (e) between about 11 and about 13 hours.

3. The apparatus of claim 1, wherein the burn chamber is sized to a hold an amount of sulfur selected from:

(a) up to about 2,000 kilograms;
(b) up to about 200 kilograms;
(c) up to between about 30 kilograms and about 40 kilograms; and
(d) up to about ½ a kilogram.

4. The apparatus of claim 1, wherein the means for passively introducing the sulfur gases into the stream of water comprises a restrictor in the second conduit, and wherein the first conduit extends into the restrictor so as to point downstream and terminate within the restrictor.

5. A sulfurous acid generator apparatus comprising:
a burn chamber in which to combust sulfur, the burn chamber comprising at least one sidewall lacking any openings thereby at all times preventing sulfur from being added to the burn chamber through the sidewall, a floor member, a cover, an air inlet, and a gas outlet, and an ignition inlet adapted to restrict the passage of debris larger than a drop of molten sulfur into the burn chamber;
a first conduit connected to the gas outlet for conducting sulfur gases at substantially atmospheric pressure;
a second conduit for conducting a stream of water;
means for passively introducing the sulfur gases conducted in the first conduit into the stream of water in the second conduit;
wherein the flow of water through the second conduit creates an induced draw to draw sulfur gases through the first conduit
wherein the burn chamber has a height that is sufficient to allow a portion of the burn chamber to act as a sulfur hopper to hold sulfur that is to be combusted without increasing the rate of combustion; and
wherein the height of the burn chamber is sized to hold an initial charge of sulfur that is large enough to allow the generator to produce sulfurous acid under at least one operating condition for between about ½ an hour and about 1,000 hours without needing additional sulfur to be introduced into the burn chamber.

6. The apparatus of claim 5, wherein the height of the burn chamber is sized to hold enough sulfur to allow the sulfurous acid generator to generate sulfurous acid under at least one operating condition, without the introduction of additional sulfur into the burn chamber, for a period of time selected from:
(a) between about 1 hour and about 100 hours;
(b) between about 2 hours and about 24 hours;
(c) between about 8 hours and about 16 hours; and
(d) between about 11 and about 13 hours.

* * * * *